Oct. 1, 1957     A. C. SCINTA     2,807,821
WINDSHIELD WIPER
Filed Feb. 12, 1954
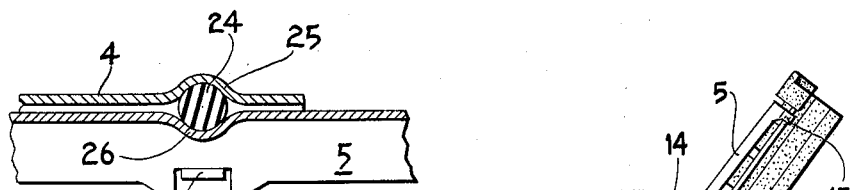
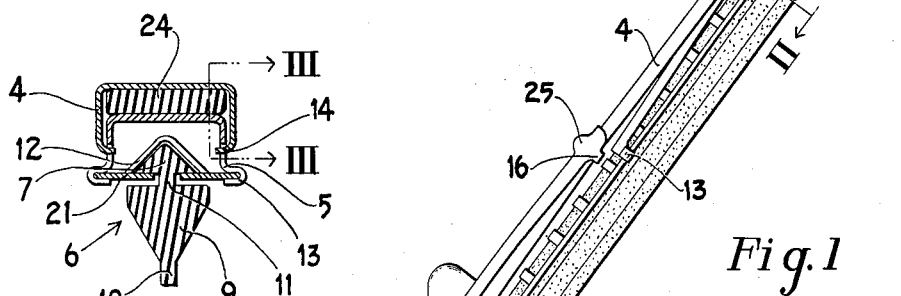
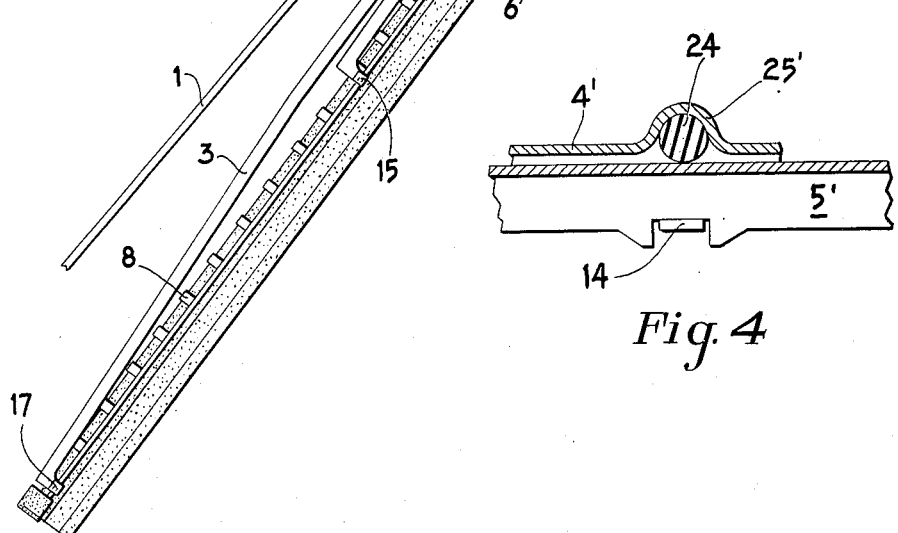
INVENTOR.
Anthony C. Scinta
BY
Beau, Brooks, Buckley & Beau,
ATTORNEYS.

United States Patent Office 2,807,821
Patented Oct. 1, 1957

2,807,821

WINDSHIELD WIPER

Anthony C. Scinta, Buffalo, N. Y., assignor to Trico Products Corporation, Buffalo, N. Y.

Application February 12, 1954, Serial No. 409,873

6 Claims. (Cl. 15—245)

This invention relates to a windshield wiper, and more particularly to a wiper adapted to clean curved windshield surfaces.

Heretofore, those wipers adapted to clean curved windshields comprised rubber squeegees mounted in flexible backing strips. The strips were connected to a superstructure comprising a plurality of rigid yokes having a centrally located clip for attachment to the spring pressed actuating arm. The spring created pressure was transmitted to and distributed along the backing strip by the superstructure so as to cause the squeegee to conform to the curvature of the shield.

Since the surface contour of the shield changes from point to point, the wiper must be provided with sufficient flexibility to permit it to flex into conformity with the constantly changing curvature of the surface as it oscillates thereacross. In order to provide this requisite flexibility, the wipers were of necessity assembled in a loose jointed manner so as to permit a predetermined amount of relative movement between the various elements prior to binding. However, the apparently necessary metal on metal movement generates a considerable amount of noise which it has been found subjects the operator of the vehicle and its passengers to excessive annoyance and distraction.

Accordingly, it is the object of the present invention to provide a windshield wiper which is silent in operation and yet has sufficient flexibility to permit its conformance to the constantly changing curvature of the shield during the cleaning cycle.

For a better understanding of this and other objects of the invention, reference is made to the following specifications and accompanying drawings wherein:

Fig. 1 is a side elevational view of a windshield wiper constructed in accordance with the instant invention;

Fig. 2 is a view taken on line II—II of Fig. 1 so as to illustrate one of the superstructure fulcrum;

Fig. 3 is a view taken on line III—III of Fig. 2 so as to more clearly illustrate the superstructure fulcrum; and, Fig. 4 is a view similar to Fig. 3, but showing a modified manner of fabrication of the superstructure fulcrum.

Referring now more particularly to the drawings, the numeral 1 designates the wiper actuating arm attached to clip 2 mounted on primary lever 3; the opposite end of the arm, not shown, is connected to the rockshaft of the wiper motor as is customary. The arm 1 is spring pressed toward the windshield in a conventional manner. The pressure resulting from the arm being urged toward the windshield is transmitted from it to the primary lever, from there to the secondary lever 4, and thence to the yoke 5.

The squeegee 6 comprises a triangular marginal bead 7 seated in a channel provided therefor in backing member 8. Neck 11 connects the marginal bead to the body 9 of the squeegee which tapers to a rectangular lip 10. The backing strip comprises two flanges 21 connected by arched cross-arms or vertebrae 12 spaced along the longitudinal axis of the backing strip. The vertebrae define the top boundary of the channel for the marginal bead and also provide the flexibility requisite to the backing strip for surface conformation as the wiper moves across the constantly changing curvature of the windshield. It should be noted that a limited amount of freedom of movement is permitted between the channel and the marginal bead in order that the squeegee may more readily make uniform contact with the windshield.

Claws 13 of the yoke engage flanges 21 of the backing strip while inturned ears 14 of the secondary lever engage the mid-point of the yoke. Claws 15 at the opposite end of the secondary lever also engage the flanges of the backing strip. Similarly, ears 16 and claws 17 of the primary lever engage the secondary lever and backing strip respectively.

From the above description it may be seen that as the arm exerts pressure on the primary lever the latter will tend to flatten and spread, the spreading being permitted by the sliding connection between the various elements. This action results in the transmission of pressure to the secondary lever and to the lower end of the backing strip so as to maintain firm contact between the squeegee and windshield in that area.

Because of the pressure the secondary lever will flatten and concurrently rotate to a limited extent relative to the primary lever. The pressure applied to the secondary lever is transmitted to the backing strip and therefore to the squeegee at 15 and also to the yoke. Concurrently, the secondary lever will slide somewhat relative to the yoke which in turn tends to rotate as it applies the pressure to the squeegee via the backing strip at connections 13. It should be noted that the limited rotation of the various elements of the superstructure is an attenuated reflection of the movement of the squeegee as the latter flexes into conformity with the contour of the shield.

As should be obvious, a large volume of operational noise occurs as the various parts of the superstructure rock and slide with respect to one another as the wiper oscillates across the constantly changing curvature of the windshield. Heretofore, a knife edged fulcrum and plate connections were provided at the pivot points of the superstructure elements. These knife edges were formed by placing a V-shaped depression in the top surface of each element in the vicinity of its ears. However, it has been found that the metal on metal rocking and sliding generates a tinny rattling noise of considerable annoyance. In order to do away with this noise, a pivot having a low sound generating characteristic has been provided in place of the metallic knife edge.

In this new superstructure opposed arcuate sockets 25 and 26 are formed in the mating members 4 and 5 at the pivot point. A cylindrical member 24 composed of rubber or any other material having the desired low sound generation, durability and resiliency characteristics is placed within the opposed sockets as best seen in Figs. 2 and 3. The side walls of secondary lever 4 retain the cylindrical member within the sockets while the inturned ears 14 keep the entire assemblage from disengaging. In this manner the various parts of the superstructure roll on the cylindrical member during operation rather than rocking and sliding on the metalic knife edge. Due to the intrinsic properties of the cylindrical member the objectionable operational noise or rattle is for all practical purposes eliminated. Although only a juncture between the yoke and secondary lever has been disclosed in detail, it should be understood that a similar connection is provided between the primary and secondary levers.

A modified form of construction is illustrated in Fig. 4. Herein the lower of the two mating members 5' has an uninterrupted top surface while the upper member 4' is formed with an arcuate socket 25' encompassing more than 180°.

It may therefore be seen that by utilizing the present invention a wiper which operates both silently and efficiently is provided since pivots which create little or no noise in operation are substituted for the metallic knife edges. As a result, all sources of operational noise are either eliminated or considerably reduced.

Having thus disclosed exemplary embodiments thereof, what I claim as my invention is:

1. A windshield wiper for automotive vehicles having curved windshields comprising, a squeegee, a flexible backing strip for retaining said squeegee and for operable connection with a wiper actuating arm, a superstructure having a plurality of pivoted parts interposed between the backing strip and wiper actuating arm, pivot means for said parts having a low sound generating characteristic interposed between the pivoted parts of the superstructure, said pivot means effectively eliminating the operational noise and rattles of said superstructure parts as the wiper tends to conform to the constantly changing curvature of an associated curved windshield while moving thereacross.

2. A windshield wiper for automotive vehicles having curved windshields comprising, a squeegee, a flexible backing strip for said squeegee and for operable connection with a wiper actuating arm, a superstructure having a plurality of pivoted parts interposed between the backing strip and wiper actuating arm, claws integral with said superstructure parts and engaging the backing strip, and pivot means having a low sound generating characteristic interposed between the pivoted parts of the superstructure, said pivot means effectively eliminating the operational noise and rattles of said superstructure parts as the wiper tends to conform to the constantly changing contour of an associated curved windshield while moving thereacross.

3. A windshield wiper for automotive vehicles having curved windshields comprising, a squeegee, a flexible backing strip for said squeegee, a wiper actuating arm operatively connected to said backing strip, a superstructure having at least two mating relatively moveable parts interposed between the backing strip and wiper actuating arm, pivot means having a low sound generating characteristic interposed between said mating parts of the superstructure, and a socket in one of said mating parts for the reception and retention of said pivot means, said other mating part having an uninterrupted surface, said pivot means effectively eliminating the operational noise and rattles of said superstructure parts as the wiper tends to conform to the constantly changing contour of an associated curved windshield while moving thereacross.

4. A windshield wiper for automotive vehicles having curved windshields comprising, a squeegee, a flexible backing strip for said squeegee, a wiper actuating arm operatively connected to said backing strip, a superstructure having a plurality of relatively moveable parts interposed between the backing strip and wiper actuating arm, pivot means having a low sound generating characteristic interposed between the relatively moveable parts of said superstructure, and a socket for the reception and retention of said pivot means in at least one of said relatively moveable parts, said pivot means effectively eliminating the operational noise and rattles of said superstructure parts as the wiper tends to conform to the constantly changing contour of an associated curved windshield while moving thereacross.

5. A windshield wiper for automotive vehicles having curved windshields comprising, a squeegee, a flexible backing strip for said squeegee, a superstructure having a plurality of pivoted parts connected to said backing strip, pivot means having a low sound generating characteristic interposed between the pivoted parts of said superstructure, and a socket for the reception and retention of said pivot means in at least one of said pivoted parts, said pivot means effectively eliminating the operational noise and rattles of said superstructure parts as the wiper tends to conform to the constantly changing contour of an associated windshield while moving thereacross.

6. A windshield wiper for automotive vehicles having curved windshields comprising, a squeegee, a flexible backing strip for said squeegee, a wiper actuating arm operatively connected to said backing strip, a superstructure having at least two mating relatively moveable parts interposed between the backing strip and wiper actuating arm, pivot means having a low sound generating characteristic interposed between said mating parts of the superstructure, and opposed sockets in each of said mating parts for the reception and retention of said pivot means, said pivot means effectively eliminating the operational noise and rattles of said superstructure parts as the wiper tends to conform to the constantly changing contour of an associated windshield while moving thereacross.

References Cited in the file of this patent

UNITED STATES PATENTS

| | | |
|---|---|---|
| 1,566,026 | Liepert et al. | Dec. 15, 1925 |
| 2,667,656 | Oishei | Feb. 2, 1954 |

FOREIGN PATENTS

| | | |
|---|---|---|
| 493,728 | Canada | June 16, 1953 |
| 683,375 | Great Britain | Nov. 26, 1952 |